US010055704B2

(12) United States Patent
Kushida et al.

(10) Patent No.: US 10,055,704 B2
(45) Date of Patent: Aug. 21, 2018

(54) WORKFLOW PROVISION WITH WORKFLOW DISCOVERY, CREATION AND RECONSTRUCTION BY ANALYSIS OF COMMUNICATIONS

(71) Applicant: International Business Machines Corporation, Armonk, NY (US)

(72) Inventors: Takayuki Kushida, Bangalore (IN); Saiprasad Kolluri Venkata Sesha, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 14/482,480

(22) Filed: Sep. 10, 2014

(65) Prior Publication Data

US 2016/0071034 A1    Mar. 10, 2016

(51) Int. Cl.
G06Q 10/00    (2012.01)
G06Q 10/06    (2012.01)
G06F 17/30    (2006.01)

(52) U.S. Cl.
CPC ... G06Q 10/0633 (2013.01); G06F 17/30106 (2013.01)

(58) Field of Classification Search
CPC .......................................... G06Q 10/00–50/00
USPC .............................................. 705/7.11–7.42
See application file for complete search history.

(56) References Cited

U.S. PATENT DOCUMENTS 7,296,058 B2   11/2007   Throop
7,664,821 B1 *  2/2010   Ancin ..................... H04L 51/34
                                                          709/206
7,831,676 B1 * 11/2010   Nagar ................. G06Q 10/107
                                                          709/203
8,005,910 B2   8/2011   Ouchi
8,037,146 B2   10/2011  Carr et al.
(Continued)

FOREIGN PATENT DOCUMENTS

WO         2011090879 A2    7/2011

OTHER PUBLICATIONS

Scacchi, W. & Noll, John. "Dynamic Process Discovery, Modeling, and Recovery: Managing Knowledge Intensive Distributed Systems", Institute for Software Research University of California, Irvine; Report granted from National Science Foundation; Jun. 2005. 129pgs.

(Continued)

Primary Examiner — Alan S Miller
(74) Attorney, Agent, or Firm — Brown and Michaels, PC; David Woycechowsky (57) ABSTRACT

Discovering workflows in communications exchanged between a sender and at least one recipient. A communication is received and analyzed to detect workflow. The analyzing of the communication detects the sender and the at least one recipient from the communication; analyzes the communication to extract questions and corresponding responses; stores the questions and responses in a repository; generates a link to the questions and responses in the repository, and generating a user interface for the link to the questions and responses in the repository. A communication is then sent to the at least one recipient with a link to the questions and responses in the repository, extracted from the communication, replacing the questions and responses present in the communication.

20 Claims, 6 Drawing Sheets

(56) References Cited

U.S. PATENT DOCUMENTS

| | | | |
|---|---|---|---|
| 8,204,949 B1* | 6/2012 | Krajec | G06Q 10/06311 709/206 |
| 8,275,780 B2 | 9/2012 | Baba et al. | |
| 8,291,019 B1 | 10/2012 | Rochelle et al. | |
| 8,504,624 B2 | 8/2013 | Gormish et al. | |
| 8,560,567 B2* | 10/2013 | Azzam | G06F 17/30654 707/769 |
| 8,583,466 B2 | 11/2013 | Margulies et al. | |
| 8,849,919 B2* | 9/2014 | Gerstl | G06Q 10/107 709/206 |
| 8,983,962 B2* | 3/2015 | Nakazawa | G06F 17/30654 707/738 |
| 2002/0026435 A1* | 2/2002 | Wyss | G06F 9/4446 |
| 2003/0101153 A1* | 5/2003 | Francis | G06F 17/30654 706/47 |
| 2005/0097177 A1 | 5/2005 | McUmber et al. | |
| 2005/0283474 A1* | 12/2005 | Francis | G06F 17/30654 |
| 2006/0190493 A1* | 8/2006 | Kawai | G06Q 10/107 |
| 2006/0190830 A1* | 8/2006 | Gerstl | G06Q 10/107 715/757 |
| 2007/0038710 A1* | 2/2007 | Li | G06Q 10/107 709/206 |
| 2008/0052284 A1* | 2/2008 | Stokes | G06Q 10/06 |
| 2008/0195378 A1* | 8/2008 | Nakazawa | G06F 17/30654 704/9 |
| 2008/0263162 A1 | 10/2008 | Staiman et al. | |
| 2010/0063797 A1* | 3/2010 | Cong | G06F 17/30734 704/9 |
| 2010/0082730 A1* | 4/2010 | Fujimori | H04L 41/0226 709/202 |
| 2010/0179961 A1* | 7/2010 | Berry | G06Q 10/107 707/769 |
| 2010/0180200 A1* | 7/2010 | Donneau-Golencer | G06Q 10/10 715/705 |
| 2012/0136951 A1* | 5/2012 | Mulder | G06F 17/2211 709/206 |
| 2012/0254332 A1* | 10/2012 | Irvin | H04L 51/08 709/206 |
| 2012/0284344 A1* | 11/2012 | Costenaro | G06F 17/241 709/206 |
| 2013/0007037 A1* | 1/2013 | Azzam | G06Q 10/107 707/769 |
| 2013/0080548 A1* | 3/2013 | Krajec | G06Q 10/107 709/206 |
| 2013/0128301 A1* | 5/2013 | Goel | G06Q 10/107 358/1.15 |
| 2014/0297759 A1* | 10/2014 | Mody | H04L 51/08 709/206 |
| 2015/0095430 A1* | 4/2015 | Kaushik | H04L 51/08 709/206 |
| 2015/0169599 A1* | 6/2015 | Burnett | H04L 51/08 707/662 |
| 2015/0264111 A1* | 9/2015 | Aleksandrov | H04L 51/08 726/4 |
| 2015/0317383 A1* | 11/2015 | Alkov | G06N 99/005 707/738 |

OTHER PUBLICATIONS

Shen, J. et al. "Discovering Frequent Work Procedures from Resource Connections", International Conference on Intelligent User Interfaces, Feb. 2009. 9 pgs.

"Method and Apparatus to Facilitate Email Based Workflow Automation & Management", An IP.com Prior Art Database Technical Disclosure; Oct. 2006. 4pgs.

* cited by examiner

WORKFLOW PROVISION WITH WORKFLOW DISCOVERY, CREATION AND RECONSTRUCTION BY ANALYSIS OF COMMUNICATIONS

BACKGROUND

In an enterprise there are many hidden workflows that take place. The present invention relates to discovery of workflow, and more specifically to workflow discovery through analysis of communications, conversion of the hidden workflow to workflow within a database and presenting the workflow on a server.

Workflow as used herein is defined as a flow of communications and files which are exchanged between members of a group. These workflows may be created by individual employees on a daily basis, such as hourly, daily, monthly and so on. For example, within an enterprise, communications such as e-mail messages are usually exchanged between employees at a regular interval. Those e-mail messages may contain attached files or input within a message's body or within the message's header, which may need input from other employees on some basis. The employees spend time repeatedly processing and updating the attached files and sending these files back to the sender. The sender then has to review and check the attached files for the updated information when it is received.

For example, if a sender requests input to be placed in an attached spreadsheet file from three other employees through a communication, such as an e-mail message, each of the three employees which received the e-mail message will fill in a portion of the spreadsheet and each send an e-mail message back to the sender. The transactions associated with providing input in the spreadsheet are carried out individually by the three employees and the sender has to reconcile the three documents as they are received from the sender. This process may repeat as often as the sender needs input from the three employees. If there are five or ten employees, the process will be repeated with the number of employees at the sender. The workflows associated with providing input to the sender on a repeatable basis can result in additional overhead work among those employees, with some of the processes being duplicated between the employees involved. Furthermore, the input data in the spreadsheet is always stored in each of the employee's local disk and isn't shared, even if those files should be shared among authorized employees.

SUMMARY

According to one embodiment of the present invention, a method for discovering workflows in communications exchanged between a sender and at least one recipient. The method comprises the steps of: a computer receiving a communication; the computer analyzing the communication to detect workflow and the computer sending the communication to the at least one recipient with the link to the questions and responses in the repository, replacing the questions and responses present within the communication. The analysis of the communication to detect the workflow includes the steps of detecting the sender and the at least one recipient from the communication; analyzing the communication to extract questions and corresponding responses; storing the questions and responses in a repository; generating a link to the questions and responses in the repository; and generating a user interface for the link to the questions and responses in the repository.

According to another embodiment of the present invention, a computer program product for discovering workflows in communications exchanged between a sender and at least one recipient comprising a computer comprising at least one processor, one or more memories, one or more computer readable storage media, the computer program product comprising a computer readable storage medium having program instructions embodied therewith. The program instructions executable by the computer to perform a method comprising: receiving, by the computer, a communication; analyzing, by the computer, the communication to detect workflow and sending, by the computer, the communication to the at least one recipient with the link to the questions and responses in the repository, replacing the questions and responses present in the communication. The analysis of the communication to detect workflow includes detecting the sender and the at least one recipient from the communication; analyzing the communication to extract questions and corresponding responses; storing the questions and responses in a repository; generating a link to the questions and responses in the repository; and generating a user interface for the link to the questions and responses in the repository.

According to another embodiment of the present invention, a computer system for discovering workflows in communications exchanged between a sender and at least one recipient comprising a computer comprising at least one processor, one or more memories, one or more computer readable storage media having program instructions executable by the computer. The computer performing program instructions comprising: receiving, by the computer, a communication; analyzing, by the computer, the communication to detect workflow, and sending, by the computer, the communication to the at least one recipient with the link to the questions and responses in the repository, replacing the questions and responses present in the communication. The analysis of the communication to detect workflow including detecting the sender and the at least one recipient from the communication; analyzing the communication to extract questions and corresponding responses; storing the questions and responses in a repository; generating a link to the questions and responses in the repository; and generating a user interface for the link to the questions and responses in the repository.

DETAILED DESCRIPTION

Workflow as used in the application is defined as a flow of communications and files which are exchanged between members of a group. Workflow may also include the exchange of communications between members of a group.

Communications are messages that are sent electronically from a sender to at least one recipient. An individual communication may be an e-mail message, cellphone text message (SMS), instant message (IM), personal message (PM) or some other type of messaging service, and can include messages with attachments sent through web-based social networking services or other on-line networking sites.

The term "files" as used in the application includes, but is not limited to documents, spreadsheets, images, other equivalent formats, etc. The files may be "original files"—that is, created by the sender of the communication and being sent for the first time—or "versions" of files. "Versions" of files are files which have been modified from the original file and are being exchanged from a sender (who is possibly not the creator of the file) to one or more recipients for action, review or further modification.

In an illustrated embodiment of the present invention, files may be retrieved from a server either as a latest version of the file, or as specific item of workflow (i.e. a message sent from a specific sender to specific user(s), with its attached files).

Figure 1:
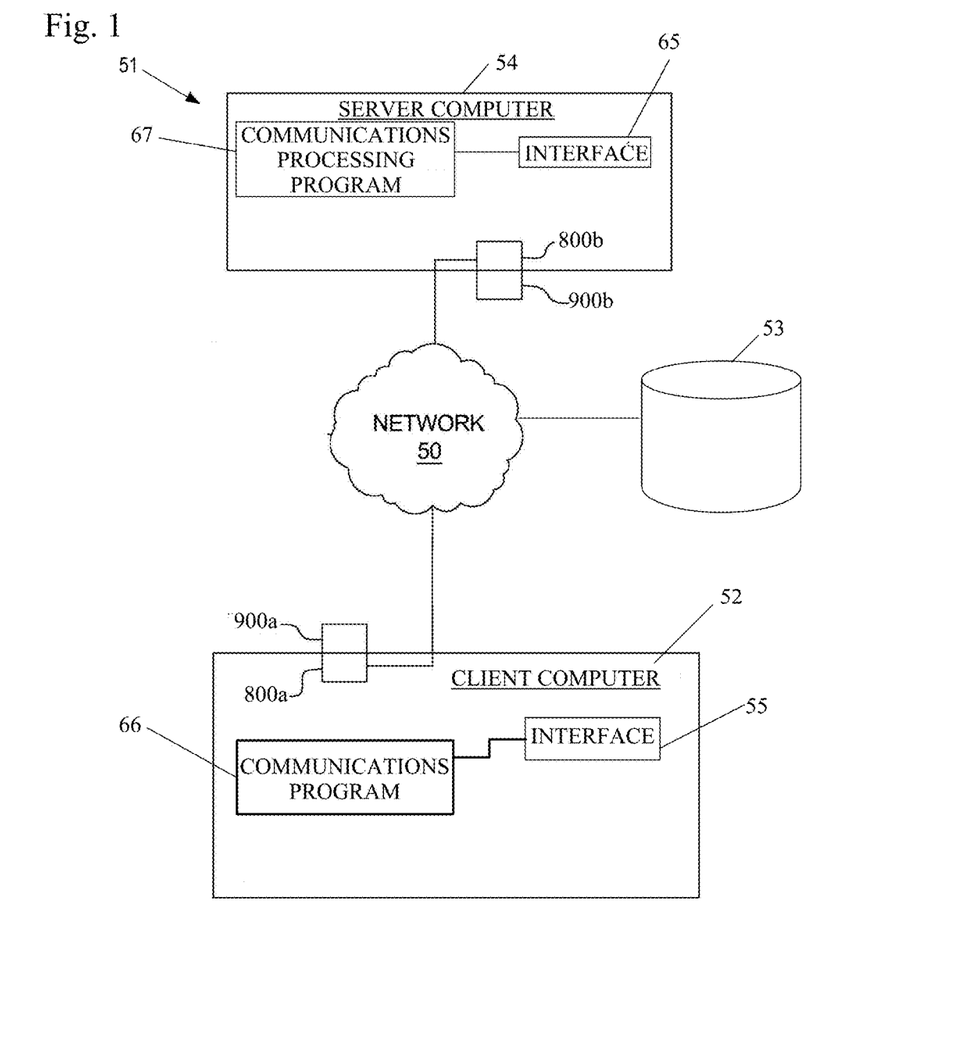
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, client computer 52, a repository 53, and a server computer 54 connect to network 50. In other exemplary embodiments, network data processing system 51 may include additional client or client computers, storage devices or repositories, server computers, and other devices not shown.

Figure 7:
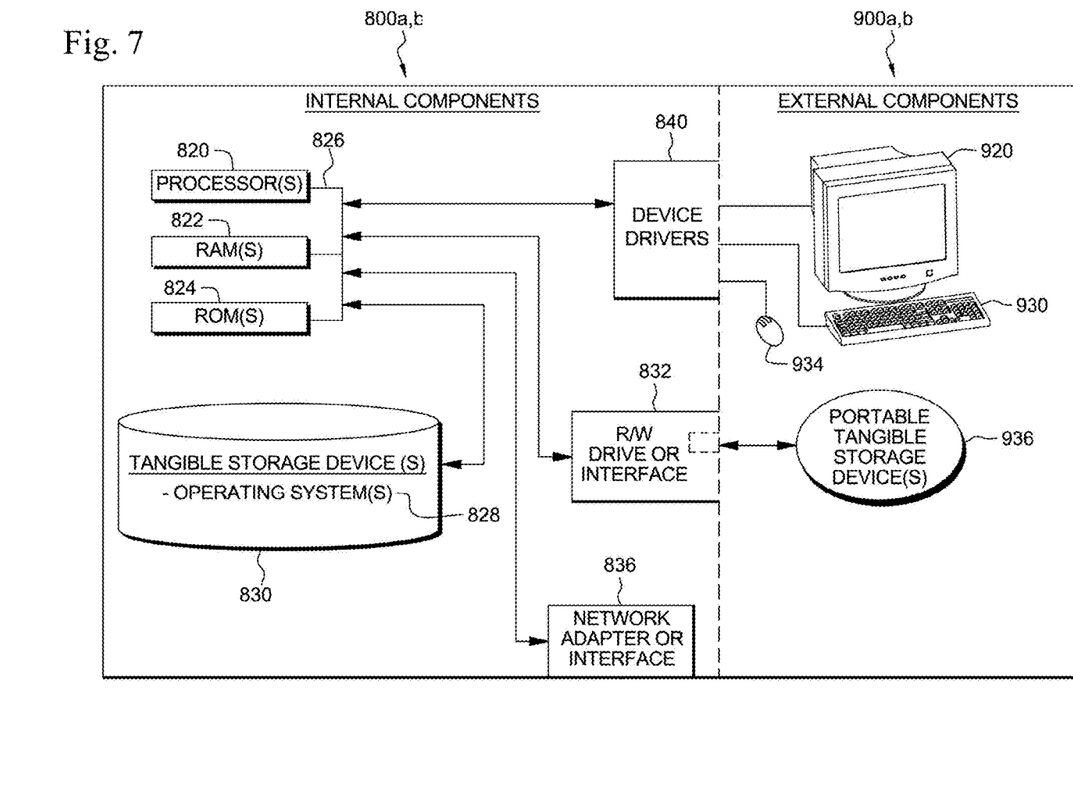
FIG. 7 illustrates internal and external components of a client or client computer and a server computer in which illustrative embodiments may be implemented.

Client computer 52 includes a set of internal components 800a and a set of external components 900a, further illustrated in FIG. 7. Client computer 52 may be, for example, a mobile device, a cell phone, a personal digital assistant, a netbook, a laptop computer, a tablet computer, a desktop computer, or any other type of computing device.

Client computer 52 may contain an interface 55. The interface 55 may accept commands and data entry from a user, queries, or used to send communications. The interface 55 can be, for example, a command line interface, a graphical user interface (GUI), or a web user interface (WUI). The client computer 52 preferably includes a communications program 66.

Server computer 54 includes a set of internal components 800b and a set of external components 900b illustrated in FIG. 7. The server computer 54 may contain an interface 65. The interface 65 may accept commands and data entry. The interface 65 can be, for example, a command line interface, a graphical user interface (GUI), or a web user interface (WUI). The server computer 54 also preferably includes a communications processing program 67.

In the depicted example, server computer 54 provides information, such as boot files, operating system images, and applications to client computer 52. Server computer 54 can compute the information locally or extract the information from other computers on network 50.

Program code and programs such as a communications processing program 67 and a communications program 66 may be stored on at least one of one or more computer-readable tangible storage devices 830 shown in FIG. 7, on at least one of one or more portable computer-readable tangible storage devices 936 as shown in FIG. 7, on repository 53 connected to network 50, or downloaded to a data processing system or other device for use. For example, program code and programs such as a communications processing program 67 and a communications program 66 may be stored on at least one of one or more tangible storage devices 830 on server computer 54 and downloaded to the client computer 52. Alternatively, server computer 54 can be a web server, and the program code and programs such as a communications processing program 67 and a communications program 66 may be stored on at least one of the one or more tangible storage devices 830 on server computer 54 and accessed on the client computer 52. Communications processing program 67 and a communications program 66 can be accessed on client computer 52 through interface 55. In other exemplary embodiments, the program code and programs such as a communications processing program 67 and a communications program 66 may be stored on at least one of one or more computer-readable tangible storage devices 830 on server computer 54 or distributed between two or more servers.

Figure 2:
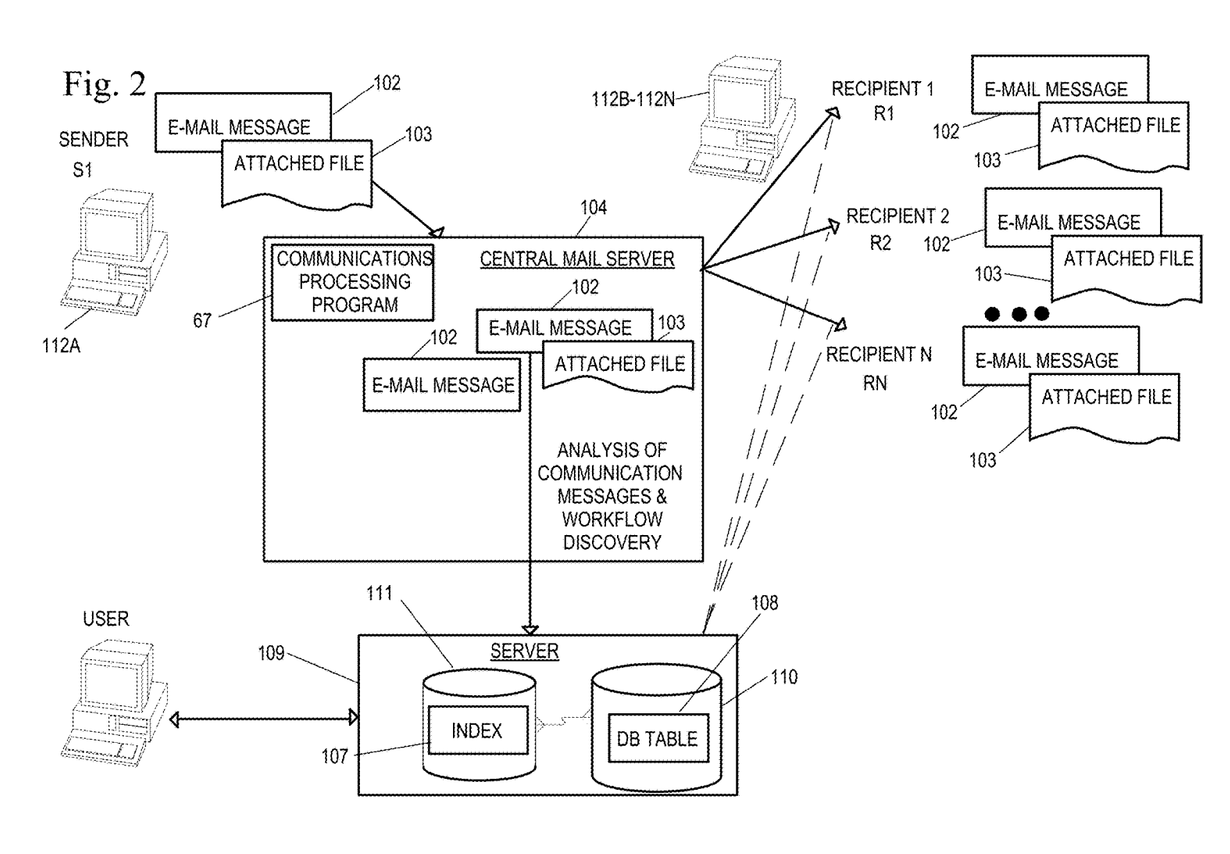
FIG. 2 shows a schematic of a discovery of workflow through analysis of communications.

FIG. 2 shows a schematic of a discovery of workflow through analysis of communications.

A central mail server 104, for example a central communication message exchange, preferably includes a communications processing program 67 to discover and analyze workflow from a communication, such as an e-mail message 102 or an e-mail 102 message with at least one attached file 103, being electronically sent through a communications program 66 in FIG. 1 present on the client computer 112A from a sender S1 to at least one recipient R1-RN. The message is received through a communications program 66 in FIG. 1 present on the client computer 112B-112N. The e-mail message includes a body, an envelope and a message header. The message header preferably includes contains control information, including, minimally, an originator's email address and one or more recipient's e-mail addresses, a subject header field and a message submission date/time stamp.

Within the central mail server 104, the e-mail message 102, and the e-mail message 102 and at least one attachment file 103 are analyzed to discover workflow. The attached file 103 is temporarily stored in a repository 110 on a server 109. The temporarily attached file and/or message may be entered on an index 107, indexed by one or more of an identification of the sender, whether the file is an original file or a version of the original file, a time of sending the message, a time of revision of the file, identification of the recipients, an indication of a type of the file, timestamp, and possibly other factors. Extracted questions and responses from the communications is stored in a database (DB) table 108 within the repository 110. The attached file 103 within the e-mail message 102 is replaced with the link to the index 107 in the repository 111 and the DB table 108 in repository 110. The communication processing program 67 in the central mail server 104 sends e-mail message 102 with the link to the index 107 to the recipients R1-RN as any previously attached files 103 in e-mail message 102 are replaced with the link. Once the recipients R1-RN receive the e-mail message 102 with the link, the recipients R1-RN clicks or selects the link to the retrieve the contents, obtain the questions from the DB table 108 in the repository 110. Any answers to the questions that are provided to the corresponding questions by the recipients R1-RN are stored in the database table 108 as shown by the dashed lines in FIG. 2. After each recipient R1-RN provides their answers to the DB table 108, the communication processing program 67 sends an e-mail message 102 notifying the sender 112A. The index may be stored in a separate repository 111 from the files, as shown, or with the files and the DB table 108 in repository 110. Repository 110 may also store copies of the messages 102. Alternatively repository 111 or 110 on the server 109 in FIG. 2 can be equivalent to repository 53 in FIG. 1. In an alternate embodiment, the server may include a repository which stores copies of the messages 102 and associates the messages within an index.

In one embodiment, a user, which may be the sender, recipient, or an alternate user may access the files through the server computer 109. The server 109 may be part of the central mail server 104 or a separate server. The central mail server 104 may be server computer 54 of FIG. 1.

Figure 3:
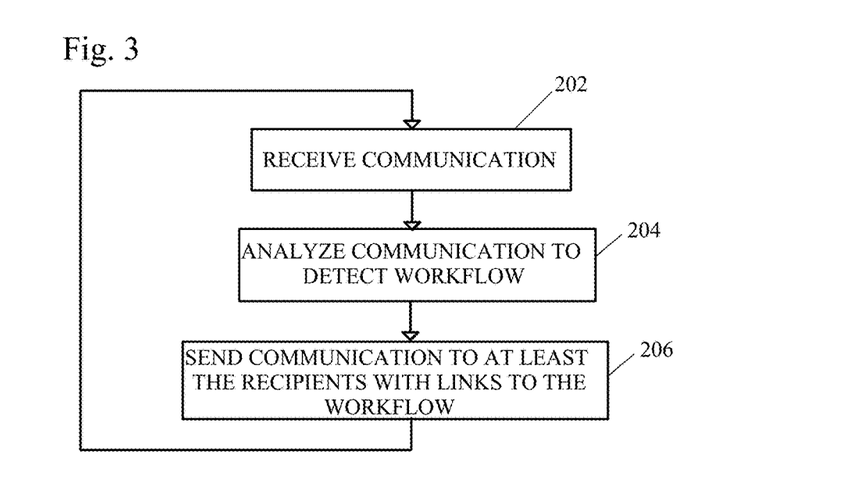
FIG. 3 shows a flowchart of a method of workflow discovery and creation of workflow by analysis of communications.

FIG. 3 shows a flowchart of a method of workflow discovery and creation of workflow by analysis of communications with an attached file.

A central mail server 104 receives a communication (step 202). The communication may be sent by a communications program 66 between client computers 52, 112A-112N. The communication has a sender S1 and at least one recipient R1-RN.

The communication is analyzed to detect a workflow (step 204), for example through a communications processing program 67.

The communication is then sent on to at least the recipients with links to the workflow (step 206), and the method repeats from step 202. It should be noted that the attached file has been removed from the communication that is actually sent to the recipients and is replaced by the link identifying the DB table 108 stored in the repository. By sending links to the workflow, the sender and recipient(s) can access the questions and answers stored in the DB table 108 in the repository 110 on server 109 through a web interface 65 in FIG. 1, rather than having to exchange the attached file(s) or link to the actual file(s) through e-mail. The contents of file(s) 108 can be replaced with the DB table 108 in the repository.

Figure 5:
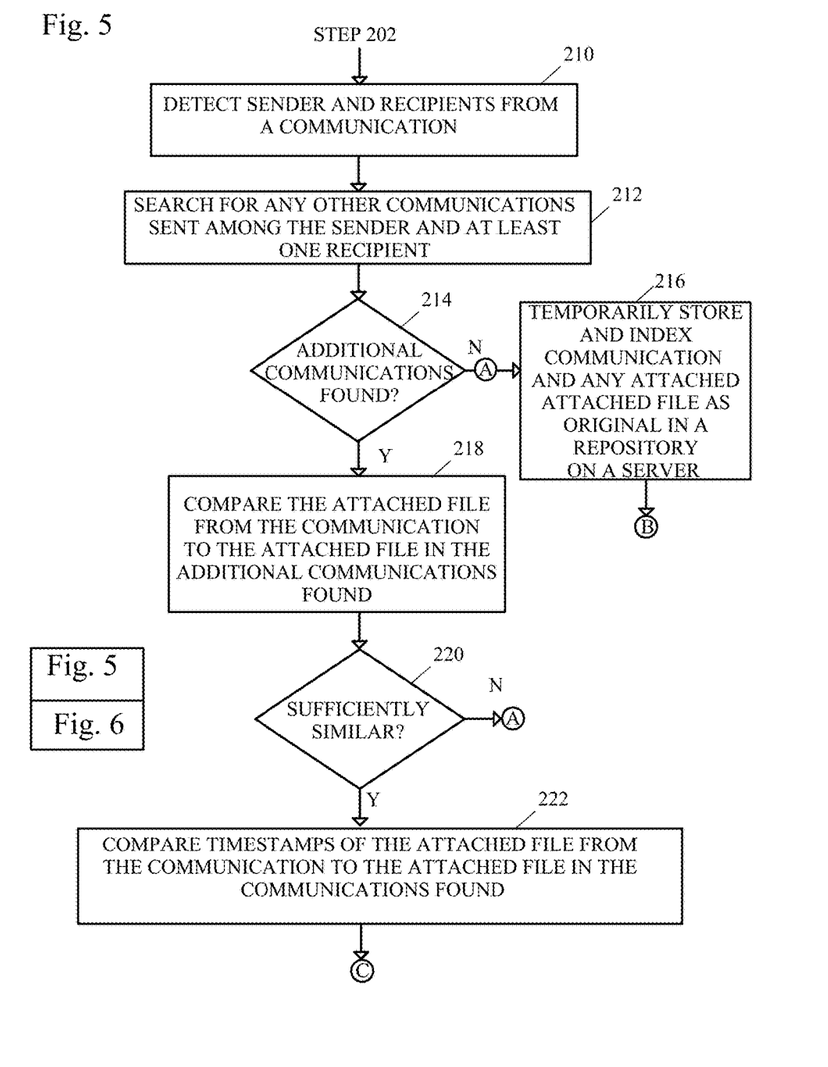
FIGS. 5-6 show a flowchart of a method to analyze communications to detect a workflow.
Figure 6:
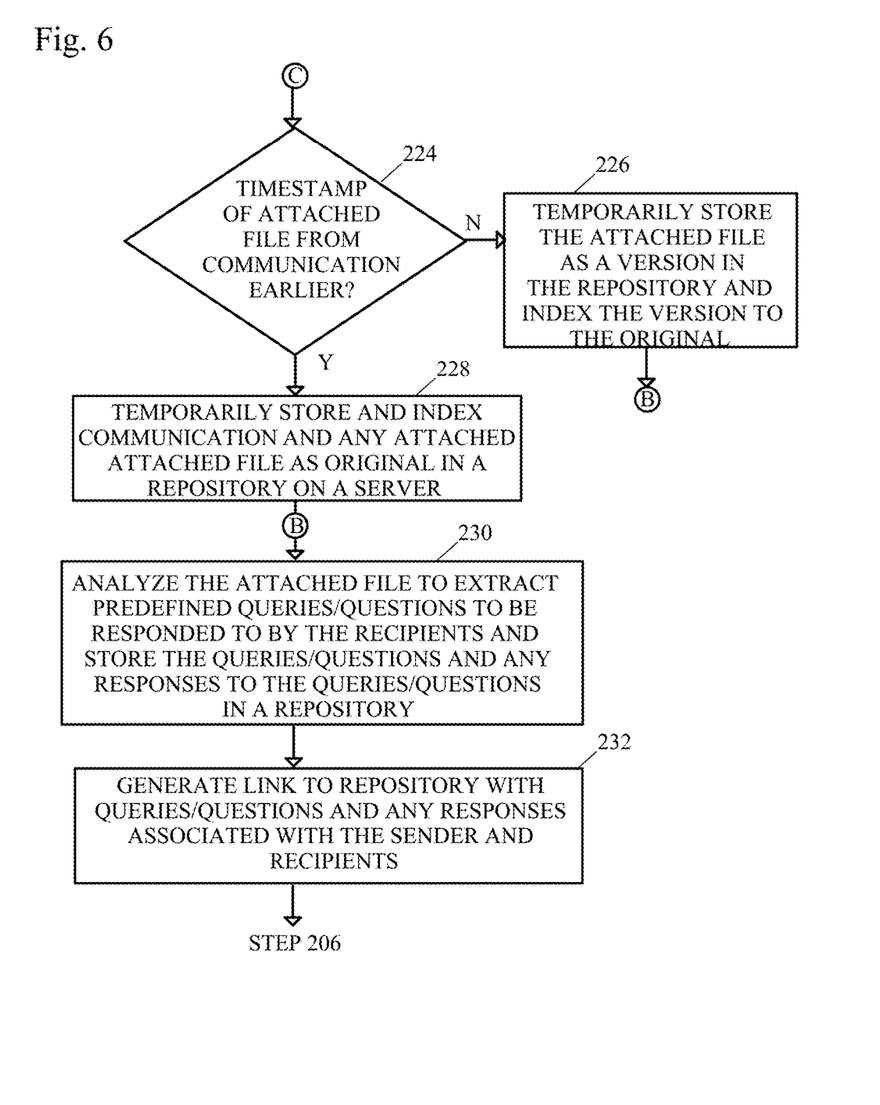

FIGS. 5-6 are a detailed flowchart of step 204 from FIG. 3.

It should be noted that in the method described within FIGS. 5-6, if the communication does not have an attached file, it is the communication itself that will be compared to other communications found to determine if the communications are sufficiently similar and when the timestamps of the communications are to determine which communication is earlier.

In a first step, a sender and at least one recipient are detected from the communication (step 210), for example by the communications processing program 67.

The server then searches the repository 110, using the index 107, for earlier communications sent among the sender and any of the recipients (step 212), for example by the communications processing program 67. The search for other communications may, if desired, be limited to messages sent during a predefined time period. The sender is assumed to send the original request for the method.

If additional communications between the sender and at least one of the recipients is not found (step 214), the attached file is indexed as an original file and the file is temporarily stored in a repository on a server (step 216) for example by the communications processing program 67. The method then continues with step 230 described below.

The files may be indexed by one or more of an identification of the sender, whether the file is an original file or a version of the original file, a time of sending the message, a time of revision of the file, identification of the recipients, an indication of a type of the file, and possibly other factors.

If additional communications between the sender and at least one of the recipients is found (step 214), each of the attached files in the communication are then compared to the files attached to all of the communications found in step 212 (step 218), for example by the communications processing program 67.

If the attached files in the communication are not sufficiently similar to the files in the found communications, return to step 216 of temporarily indexing the attached file(s) as an original file and temporarily storing the attached file(s) in a repository on a server.

If the attached files in the communication are sufficiently similar to the files in the found communications (step 220), the timestamps of the attached file from the communication are compared to the attached files in the communications found (step 222). The similarity may be present, for example in the e-mail address for sender and recipients, the similarity of the file name, the similarity of the subject in e-mail, the similarity of e-mail message sent. The amount of similarity may be predefined.

If the timestamp of the attached file from the communication is not earlier than the timestamp of any of the attached files in the communications found (step 224), the attached file is indexed as a version or new file to the original file and the version is temporarily stored in a repository on a server (step 226) and the method continues with step 230.

If the timestamp of the attached file from the communication is earlier than the timestamp of any of the attached files in the communications found (step 224), the attached file is indexed as the original file and is temporarily stored in a repository on a server (step 228) and the method continues with step 230.

The attached file which is stored in the repository, whether a version or an original, is analyzed to extract predefined queries/questions to be responded to by the recipients and store the queries/questions and any responses in the DB table within a repository with a user interface (step 230), for example by the communications processing program 67. An example of the questions/queries are "Please input your work hours in this week" or "What is your name?" which are present in the attached file from the sender.

A link to the repository containing a user interface with the queries/questions and any responses associated with the sender and the recipients is generated (step 232), for example by the communications processing program 67 and the method continues to step 206 of FIG. 3.

A communication with no attached file may also be analyzed to extract predefined queries/questions to be responded to by the recipients and store the queries/questions and any responses in a repository with a user interface. For example if a communication from a sender to a recipient included a subject line with "Are you going to the office tomorrow?", the question may be extracted and stored within a database within the repository. The answer present from the recipient, for example in the subject line, "Yes, I am going to the office tomorrow" may be associated with the question in the database.

Figure 4:
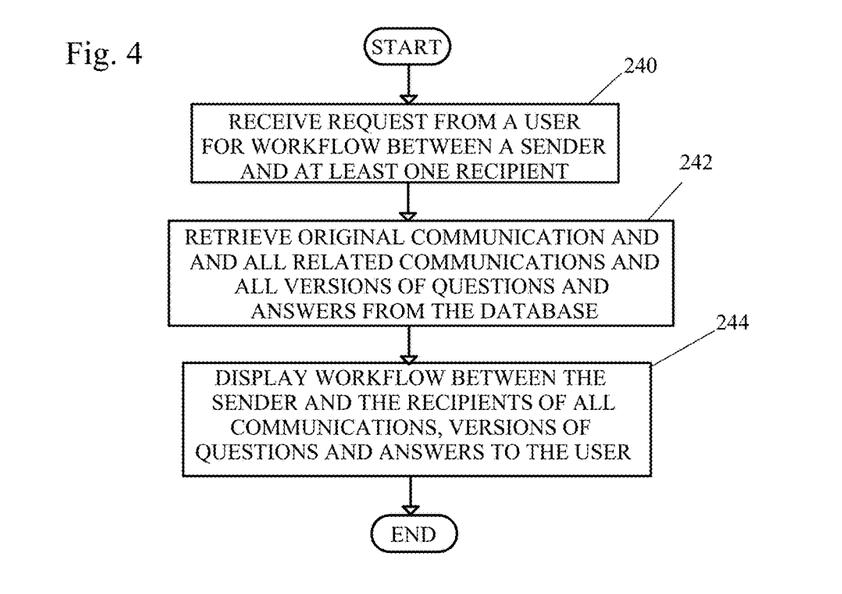
FIG. 4 shows a flowchart of a method of reconstructing a workflow.

FIG. 4 shows a flowchart of a method of reconstructing a workflow. The method of reconstructing a workflow preferably takes place after at least one attached file or communication is temporarily indexed in the repository.

A request regarding reconstructing a workflow is received from a user between a sender and at least one recipient (step 240), for example by the communications processing program 67. The user may be the sender, a recipient, or a user not present on the original communication.

Based on the request, the first or original communication and all related communications and all versions of questions and responses or answers present in the repository are retrieved (step 242) and the workflow is reconstructed, for example by the communications processing program 67. The request may additionally identify the workflow by indicating a time or date (or range of dates and/or times) when the communication containing the workflow was sent. Other factors might be specified, for example file names or other identification, original files or versions, timestamp of file, e-mail headers such as Subject field, Reply-To field, the original e-mail server.

The workflow between the sender and the recipient(s) of all communications, versions of questions/queries and answers is displayed to the user through an interface (step 244) and the method ends.

In an example, a project manager may send a project request via e-mail to a team manager with an attached file. The attached file may include queries regarding the project requested and the number of hours and task required to complete the project. The communications processing program of the central mail server analyzes the e-mail between the project manager and the team manager for a workflow.

The communications processing program searches the mail server for any additional e-mails between the team manager and the project manager. An e-mail with an attached file is found between the team manager and the project manager. The attached file from the discovered or found e-mail is compared to the attached file sent in the project request e-mail. The files are not sufficiently similar, so the attached file from the project request e-mail is determined to be an original file and is temporarily stored in a repository in communication with a server, either the mail server or another server, for example a web server and is indexed with at least the sender, the project manager in this example and a recipient, the team manager. The file may also be indexed by the e-mail, the file type, timestamp, and/or date.

The attached file from the project request e-mail is analyzed to extract predefined queries or questions in which require the team manager's input. Any responses to the queries that may have been entered into the attached file are also extracted. The extracted questions or queries and associated responses are stored, for example, in a database table in a repository accessible to a server. A link to the database table within the repository with the questions or queries and associated responses is generated and sent to at least the team manager. The team manager and other management staff can access the questions or queries and associated responses on a server through a user interface. This process is repeated as necessary whenever additional communications with attached files take place.

At some point later, the project manager or team manager or other user(s) may wish to reconstruct the workflow that took place at some specific time or who sent a specific version of an attached file. So, a user may request the workflow between the project manager and the team manager. The request is processed by the communications processing program and retrieves all communications between the project manager and the team manager, all questions/queries and all responses from the repository. The workflow of all communications between the project manager and the team manager, all questions/queries and all responses from the repository are displayed to the user through an interface.

FIG. 7 illustrates internal and external components of client computer 52 and server computer 54 in which illustrative embodiments may be implemented. In FIG. 7, client computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, a communications processing program 67 and a communications program 66 are stored on one or more of the computer-readable tangible storage devices 830 for execution by one or more of the processors 820 via one or more of the RAMs 822 (which typically include cache memory). In the embodiment illustrated in FIG. 7, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Communications processing program 67 and communications program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Communications processing program 67 and communications program 66 can be downloaded to the client computer 52 and server computer 54 from an external computer via a network (for example, the Internet, a local area network or other, wide area network) and network adapter or interface 836. From the network adapter or interface 836, communications processing program 67 and communications program 66 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Communications processing program 67 and communications program 66 can be written in various programming languages including low-level, high-level, object-oriented or non object-oriented languages. Alternatively, the functions of a communications processing program 67 and a communications program 66 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method for discovering workflows in communications exchanged between a sender and at least one recipient, comprising the steps of:
   a computer receiving a communication;
   the computer analyzing the communication to detect workflow by the steps of:
   detecting the sender and the at least one recipient from the communication;
   analyzing the communication to extract questions and corresponding responses;
   storing the questions and responses in a repository;
   generating a link to the questions and responses in the repository;
   generating a user interface for the link to the questions and responses in the repository; and
   the computer sending the communication to the at least one recipient with the link to the questions and responses in the repository, replacing the questions and responses present within the communication.

2. The method of claim 1, wherein the questions and corresponding responses are extracted from an attached file attached to the communication and stored in the repository.

3. The method of claim 2, wherein the step of analyzing the communication to extract questions and corresponding responses further comprises the steps of:
   the computer searching for any other communications sent among the sender and the at least one recipient;
   if additional communications are found from the search, comparing the attached file in the additional communications to the attached file in the communication; and
   if the attached file in the additional communications is sufficiently similar to the attached file in the communication, comparing a timestamp of the attached file in the additional communications to a timestamp of the attached file in the communication, and if the timestamp of the attached file in the communication is earlier, indexing the attached file as an original file associated with at least the sender and the at least one recipient.

4. The method of claim 2, wherein the step of analyzing the communication to extract questions and corresponding responses comprises the steps of:
   the computer searching for any other communications sent among the sender and the at least one recipient;
   if additional communications are not found, indexing the attached file as an original file associated with at least the sender and the at least one recipient.

5. The method of claim 2, wherein the step of the step of analyzing the communication to extract questions and corresponding responses comprises the steps of:
   the computer searching for any other communications sent among the sender and the at least one recipient;
   if additional communications result from the search, comparing the attached file in the additional communications to the attached file in the communication; and
   if the attached file in the additional communications is sufficiently similar to the attached file in the communication, comparing timestamps of the attached file in the additional communications to the attached file in the communication and if the timestamp of the attached file in the communication is later, indexing the attached file as a version associated with an original file, at least the sender and the at least one recipient.

6. The method of claim 1, wherein the step of generating a link to the questions and responses in the repository further comprises creating a user interface to the questions and responses in the repository.

7. The method of claim 1, further comprising:
   the computer receiving a request from a user for workflow between a sender and at least one recipient;
   the computer reconstructing a workflow between a sender and at least one recipient by searching for communications, attached files, questions and responses in the repository based on the user request; and
   the computer displaying the workflow between the sender and the at least one recipient to the user.

8. The method of claim 1, wherein the step of analyzing the communication to extract questions and corresponding responses further comprises the steps of:
   the computer searching for any other communications sent among the sender and the at least one recipient;
   if additional communications are found from the search, comparing the communication received to the additional communications found; and
   if the communication in the additional communications is sufficiently similar to the communication received, comparing a timestamp of the additional communications to a timestamp of the communication received, and if the timestamp of the communication received is earlier, indexing the communication as an original file associated with at least the sender and the at least one recipient.

9. The method of claim 1, wherein the step of the step of analyzing the communication to extract questions and corresponding responses comprises the steps of:
   the computer searching for any other communications sent among the sender and the at least one recipient;
   if additional communications result from the search, comparing the additional communications to the communication received; and
   if the additional communications are sufficiently similar to the communication received, comparing timestamps of the additional communications to the communication received and if the timestamp of the communication received is later, indexing the attached file as a version associated with an original file, at least the sender and the at least one recipient.

10. A computer program product for discovering workflows in communications exchanged between a sender and at least one recipient comprising a computer comprising at least one processor, one or more memories, one or more computer readable storage media, the computer program product comprising a computer readable storage medium having program instructions embodied therewith, the program instructions executable by the computer to perform a method comprising:
    receiving, by the computer, a communication;
    analyzing, by the computer, the communication to detect workflow by the steps of:
    detecting the sender and the at least one recipient from the communication;
    analyzing the communication to extract questions and corresponding responses;
    storing the questions and responses in a repository;
    generating a link to the questions and responses in the repository;
    generating a user interface for the link to the questions and responses in the repository; and
    sending, by the computer, the communication to the at least one recipient with the link to the questions and responses in the repository, replacing the questions and responses present in the communication.

11. The computer program product of claim 10, wherein the questions and corresponding responses are extracted from an attached file attached to the communication and stored in the repository.

12. The computer program product of claim 11, wherein the program instructions of analyzing, by the computer, the communication to extract questions and corresponding responses comprises the program instructions of:
   searching, by the computer, for any other communications sent among the sender and the at least one recipient;
   if additional communications are found from the search, comparing, by the computer, the attached file in the additional communications to the attached file in the communication; and
   if the attached file in the additional communications is sufficiently similar to the attached file in the communication, comparing, by the computer, a timestamp of the attached file in the additional communications to a timestamp of the attached file in the communication, and if the timestamp of the attached file in the communication is earlier, indexing, by the computer, the attached file as an original file associated with at least the sender and the at least one recipient.

13. The computer program product of claim 11, wherein the program instructions of analyzing, by the computer, the communication to extract questions and corresponding responses comprises the program instructions of:
   searching, by the computer, for any other communications sent among the sender and the at least one recipient;
   if additional communications are not found, indexing, by the computer, the attached file as an original file associated with at least the sender and the at least one recipient.

14. The computer program product of claim 11, wherein the program instructions of analyzing, by the computer, the communication to extract questions and corresponding responses comprises the program instructions of:
   searching, by the computer, for any other communications sent among the sender and the at least one recipient;
   if additional communications result from the search, comparing, by the computer, the attached file in the additional communications to the attached file in the communication; and
   if the attached file in the additional communications is sufficiently similar to the attached file in the communication, comparing, by the computer, timestamps of the attached file in the additional communications to the attached file in the communication and if the timestamp of the attached file in the communication is later, indexing, by the computer, the attached file as a version associated with an original file, at least the sender and the at least one recipient.

15. The computer program product of claim 10, wherein the program instructions of generating a link to the questions and responses in the repository further comprises creating, by the computer, a user interface to the questions and responses in the repository.

16. The computer program product of claim 10, further comprising:
   receiving, by the computer, a request from a user for workflow between a sender and at least one recipient;
   reconstructing, by the computer, a workflow between a sender and at least one recipient by searching for communications, attached files, questions and responses in the repository based on the user request; and
   displaying, by the computer, the workflow between the sender and the at least one recipient to the user.

17. A computer system for discovering workflows in communications exchanged between a sender and at least one recipient comprising a computer comprising at least one processor, one or more memories, one or more computer readable storage media having program instructions executable by the computer to perform the program instructions comprising:
   receiving, by the computer, a communication;
   analyzing, by the computer, the communication to detect workflow by the steps of:
   detecting the sender and the at least one recipient from the communication;
   analyzing the communication to extract questions and corresponding responses;
   storing the questions and responses in a repository;
   generating a link to the questions and responses in the repository;
   generating a user interface for the link to the questions and responses in the repository; and
   sending, by the computer, the communication to the at least one recipient with the link to the questions and responses in the repository, replacing the questions and responses present in the communication.

18. The computer system of claim 17, wherein the questions and corresponding responses are extracted from an attached file attached to the communication and stored in the repository.

19. The computer system product of claim 18, wherein the program instructions of analyzing, by the computer, the communication to extract questions and corresponding responses comprises the program instructions of:
   searching, by the computer, for any other communications sent among the sender and the at least one recipient;
   if additional communications are found from the search, comparing, by the computer, the attached file in the additional communications to the attached file in the communication; and
   if the attached file in the additional communications is sufficiently similar to the attached file in the communication, comparing, by the computer, a timestamp of the attached file in the additional communications to a timestamp of the attached file in the communication, and if the timestamp of the attached file in the communication is earlier, indexing, by the computer, the attached file as an original file associated with at least the sender and the at least one recipient.

20. The computer system of claim 17, wherein the program instructions of generating a link to the questions and responses in the repository further comprises creating, by the computer, a user interface to the questions and responses in the repository.

* * * * *